(12) United States Patent  
Wu

(10) Patent No.: US 8,796,612 B2  
(45) Date of Patent: Aug. 5, 2014

(54) OPTICAL FIBER CONNECTOR INCLUDING LIGHT TRANSCEIVERS

(75) Inventor: Kai-Wen Wu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 27 days.

(21) Appl. No.: 13/527,937

(22) Filed: Jun. 20, 2012

(65) Prior Publication Data  
US 2013/0306846 A1 Nov. 21, 2013

(30) Foreign Application Priority Data  
May 16, 2012 (TW) .............................. 101117427 A

(51) Int. Cl.  
*G01J 1/04* (2006.01)  
*G01B 9/10* (2006.01)  
*G02B 6/32* (2006.01)  
*G02B 6/38* (2006.01)

(52) U.S. Cl.  
USPC ................... 250/227.11; 250/227.28; 385/33; 385/65

(58) Field of Classification Search  
USPC ............. 250/239, 227.11, 227.14, 227.28, 250/227.29, 227.3, 227.31, 227.32; 385/33, 385/39, 54, 55, 60, 61, 65, 72, 73, 74, 385/76–78, 83; 359/19, 34, 355, 808  
See application file for complete search history.

(56) References Cited

U.S. PATENT DOCUMENTS

| | | | |
|---|---|---|---|
| 5,095,517 A * | 3/1992 | Monguzzi et al. | 385/90 |
| 2002/0076173 A1* | 6/2002 | Jiang et al. | 385/92 |

* cited by examiner

Primary Examiner — Georgia Y Epps  
Assistant Examiner — Don Williams  
(74) Attorney, Agent, or Firm — Novak Druce Connolly Bove + Quigg LLP

(57) ABSTRACT

An optical fiber connector is positioned on a printed circuit board (PCB) and includes a main body, a number of slots, and a number of optical fibers. The main body includes a number of light transceivers. Each of the light transceivers includes a light transmitting module and a light receiving module adjacent to the light transmitting module. One end of each of the optical fibers is optically coupled to a respective one of the light emitting modules and the light receiving modules, and the other end of each of the optical fibers is mounted on a respective one of the slots.

3 Claims, 3 Drawing Sheets

OPTICAL FIBER CONNECTOR INCLUDING LIGHT TRANSCEIVERS

BACKGROUND

1. Technical Field

The present disclosure relates to optical fiber connectors, and particularly, to an optical fiber connector which can be used as an optical signal emitting terminal and/or an optical signal receiving terminal.

2. Description of Related Art

An optical fiber connector may include a number of slots and a number of transceivers corresponding to the slots respectively. Each transceiver includes a light emitting module and a light receiving module, and the corresponding slot is connected to the light emitting module and the light receiving module through two optical fibers. The transceivers are mounted on a printed circuit board (PCB). The PCB has a first area and a second area separated form the first area. The light emitting modules are arranged on the first area, the light receiving modules are arranged on the second area; therefore, there exists a long distance between the light emitting module and the light receiving module of a same light transceiver. The two optical fibers extending from the same slot need to be severely bent to connect to the light emitting module and the light receiving module, which may damage the optical fibers and influence the transmitting efficiency of the optical fibers.

Therefore, it is desirable to provide an optical fiber connector that can overcome the above-mentioned limitations.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
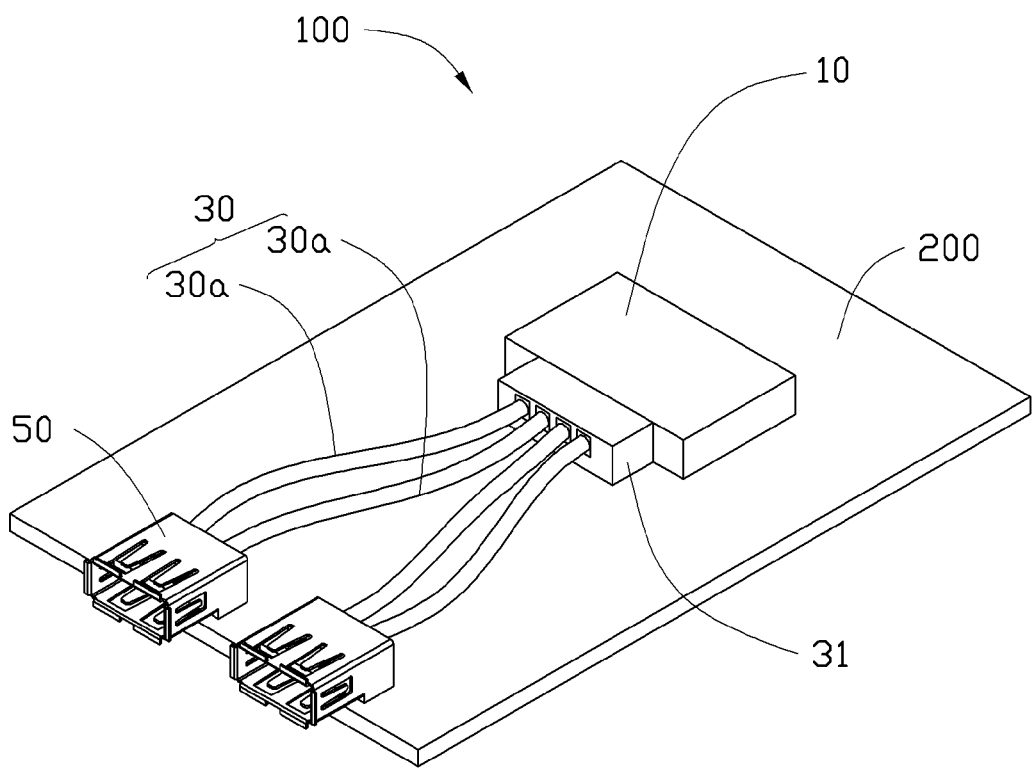
FIG. 1 is a schematic view of an optical fiber connector, according to an exemplary embodiment.

FIG. 1, shows an optical fiber connector 100 according to one embodiment. The optical fiber connector 100 is positioned on a printed circuit board (PCB) 200 of an electrical device (such as a motherboard of computers). The optical fiber connector 100 is used for exchanging signals between the PCB 200 and an external device (such as an U-disk).

Figure 2:
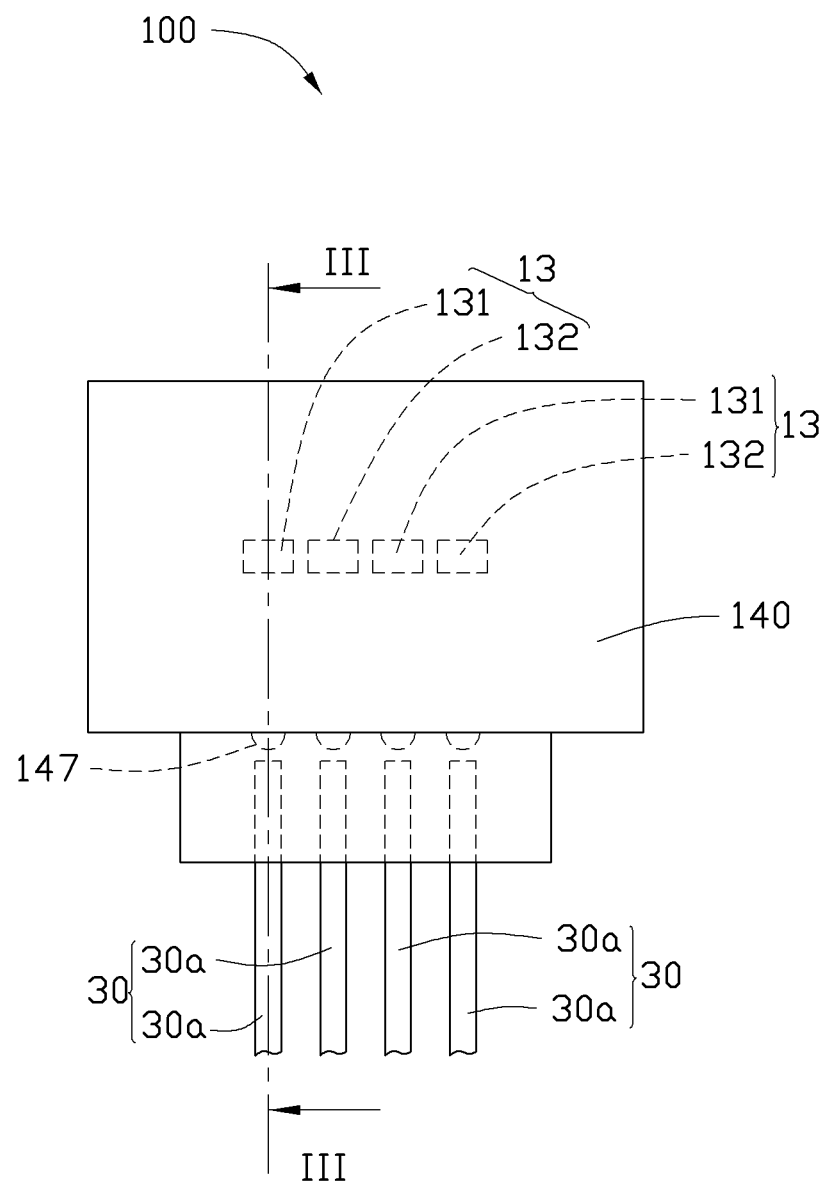
FIG. 2 is a top view of a main body and a number of optical fibers of the optical fiber connector of FIG. 1.
Figure 3:
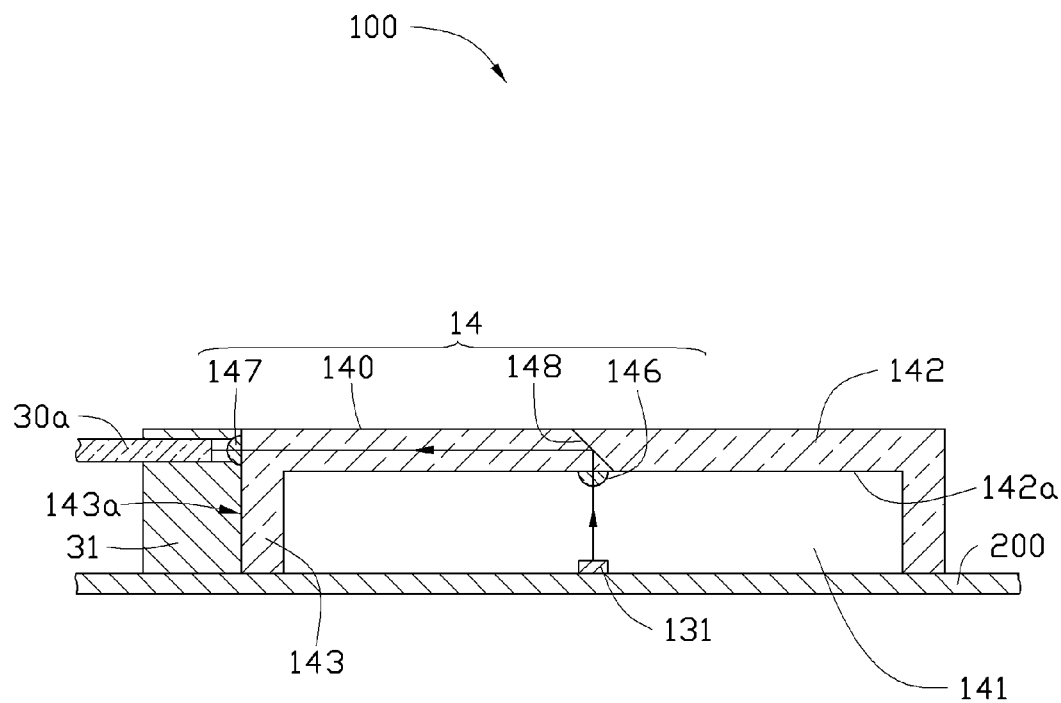
FIG. 3 is a schematic, sectional view of the optical fiber connector, taken along a line in FIG. 2.

Referring also to FIGS. 2 and 3, the optical fiber connector 100 includes a main body 10, a number of optical fiber groups 30, and a number of slots 50. The main body 10 includes a number of light transceivers 13 and an optical-electrical converting lens (OE lens) 14.

The light transceivers 13 are positioned on the PCB 300 and share a horizontal line. Each of the light transceivers 13 includes a light emitting module 131 and a light receiving module 132. The light emitting module 131 is used for emitting a first optical signal. The light receiving module 132 is used for receiving a second optical signal from another optical fiber connector (not shown). The light emitting module 131 and the light receiving module 132 of each light transceiver 13 are adjacent to each other.

The OE lens 14 includes a cuboid substrate 140, a number of first converging lenses 146, a number of second converging lenses 147, and a reflecting lens 148. A surface of the substrate 140 facing the PCB 200 defines a receiving groove 141 receiving the light transceivers 13. The substrate 140 includes a top wall 142 and a side wall 143 connected to the top wall 142. The top wall 142 has an inner surface 142a facing the PCB 200. The side wall 143 includes an outer surface 143a. The first converging lenses 146 are positioned on the inner surface 142a. The second converging lenses 147 are positioned on the outer surface 143a. The reflecting lens 148 is integrated in the top wall 142, and is used for reflecting the first optical signal from the first converging lens 146 to the corresponding second converging lens 147, and is further used for reflecting the second optical signal from the second converging lens 147 to the first converging lens 146.

The optical fiber groups 30 are corresponding to the light transceivers 13 respectively and can exchange optical signals with the corresponding light transceivers 13 through the OE lens 14. The slots 50 are positioned on an edge of the PCB 200 for conveniently receiving the external device (not shown). Each of the slots 50 is connected a corresponding optical fiber group 30.

Each of the optical fiber groups 30 includes two optical fibers 30a. Each of the optical fibers 30a is connected between a slot 50 and a second converging lens 147.

The optical fiber connector 100 further includes a connecting element 31. The connecting element 31 is used for connecting the optical fibers 30a to the outer surface 143a of the side wall 143 and aligning the optical fibers 30a with the corresponding second converging lenses 147. The number of the connecting elements 31 is not limited to this embodiment. In another embodiment, the number of the connecting element 31 also can be equal to the number of the optical fiber groups 30.

In use, if the optical fiber connector 100 is used as an optical signal emitting terminal, the light emitting module 131 emits the first optical signal. The first optical signal is converged by the corresponding first converging lens 146 and then the reflecting lens 148 reflects the first optical signal into the second converging lens 147. Finally, another optical fiber connector (not shown) receives the first optical signal converged by the second converging lens 147.

If the optical fiber connector 100 is used as an optical signal receiving terminal, the second optical signal from another optical fiber connector (not shown) is transmitted by the optical fibers 30a corresponding to the light receiving modules 132. The second converging lens 147 converges the second optical signal, the reflecting lens 148 reflects the second optical signal to the corresponding first converging lens 146, finally, the light receiving module 132 receives the second optical signal converged by the first converging lens 146.

The light emitting module 131 and the light receiving module 132 of a same light transceiver 130 are adjacent to each other. Therefore, the optical fiber groups 30 do not need to be severely bent to connect the light transceiver 130 and the corresponding slot 50, and thus the optical fiber groups 30 can be effectively protected, and the transmitting efficiency of the first optical signal and the second optical signal can be improved.

In another embodiment, the number of the reflecting lens 148 can be more than one, and each of the reflecting lenses 148 is corresponding to one of the second converging lenses 147 and one of the optical fiber groups 30.

In another embodiment, the optical transceiver 13 may not share the same horizontal line.

It will be understood that the above particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. An optical fiber connector positioned on a printed circuit board, the optical fiber connector comprising:
    a main body comprising a plurality of light transceivers positioned on the printed circuit board; wherein each of the light transceivers comprises a light emitting module and a light receiving module, the light emitting module and the light receiving module of a same light transceiver are adjacent to each other;
    a plurality of slots;
    a plurality of optical fibers, wherein one end of each of the optical fibers is optically coupled to a respective one of the light emitting modules and the light receiving modules, and the other end of each of the optical fibers is mounted on a respective one of the slots;
    an optical-electrical converting lens comprising a substrate, the substrate comprising a top wall opposite to the printed circuit board, and a side wall connected to the top wall, the side wall comprising an outer surface; and
    at least one connecting element secured on the outer surface of the side wall and holding the ends of the optical fibers close to the second converging lenses, wherein the substrate defines a receiving groove, the light transceivers are received in the receiving groove, the optical-electrical converting lens further comprises at least one reflecting lens integrated in the top wall, the at least one reflecting lens is configured for reflecting first optical signals from the light emitting modules to the corresponding optical fibers and further configured for reflecting second optical signals from the optical fibers to the corresponding second receiving modules.

2. The optical fiber connector of claim 1, wherein the top wall has an inner surface, the optical-electrical converting module further comprises a plurality of first converging lenses positioned on the inner surface, each of the light emitting modules of the light receiving modules is optically aligned to a respective one of the first converging lenses, each of the first converging lenses is optically aligned with a respective one of the at least one reflecting lens.

3. The optical fiber connector of claim 2, wherein the optical-electrical converting lens further comprises a plurality of second converging lenses positioned on the outer surface, each of the second converging lenses is optically aligned with one end of a respective one of the optical fibers and a respective one of the at least one reflecting lens.

* * * * *